United States Patent

Oshino et al.

Patent Number: 5,248,993
Date of Patent: Sep. 28, 1993

[54] THERMAL PRINTER HAVING A CONTROLLER FOR CONTROLLING PAPER FEED OPERATION AND A PRINTING METHOD THEREOF

[75] Inventors: Genzi Oshino; Yutaka Shibata; Hideaki Matsuda, all of Miyagi, Japan

[73] Assignee: Tohoku Ricoh Co., Ltd., Miyagi, Japan

[21] Appl. No.: 755,975

[22] Filed: Sep. 6, 1991

[30] Foreign Application Priority Data

Sep. 7, 1990 [JP] Japan ................ 2-235856

[51] Int. Cl.⁵ .................................... B41J 2/32
[52] U.S. Cl. ........................ 346/76 PH; 346/134; 400/232
[58] Field of Search ............... 346/76 PH, 134; 400/232

[56] References Cited

U.S. PATENT DOCUMENTS 4,795,281  1/1989  Ulinski, Sr. et al. ............ 346/76 PH

FOREIGN PATENT DOCUMENTS

0233271  10/1987  Japan .................. 400/232

Primary Examiner—Benjamin R. Fuller
Assistant Examiner—Huan Tran
Attorney, Agent, or Firm—Armstrong, Westerman, Hattori, McLeland & Naughton

[57] ABSTRACT

The invention relates to a thermal printer and a printing method thereby, using a step motor for feeding a sheet of paper, a scanning type thermal head and a control unit by which the paper feeding operation is temporarily stopped and the printing operation is restarted after the stopped period. This thermal printer further comprises a delay drive unit which drives the thermal head with delay of one or two clock periods, predetermined as a control parameter for this printing operation, by a phase switch timing point for the step motor, in response to the time-lag defined by the phase switch timing point to an actual paper feeding motion; and a preprint unit which outputs a command signal to begin the printing operation of the thermal head for printing one or more times the print data which follows the final print data of when the paper feeding operation was stopped, prior to the above described regular drive operation of the thermal head at the restart of the printing operation. Whereby this thermal printer can provide a high quality print without any print gaps and unclear prints due to the interruption of the printing operation.

4 Claims, 9 Drawing Sheets

THERMAL PRINTER HAVING A CONTROLLER FOR CONTROLLING PAPER FEED OPERATION AND A PRINTING METHOD THEREOF

BACKGROUND OF THE INVENTION

1. Field of the Invention

The present invention relates,, to a thermal printer having a paper feeding mechanism which employs a step motor, and having a printing mechanism which employs a linear scanning thermal head to print letters and bar codes on paper sheets, labels or the like. In addition, the present invention includes a method for printing letters and bar codes by the above-mentioned thermal printer.

2. Description of the Prior Art

Commonly used thermal printers are generally ,equipped with a paper feeding mechanism which employs a step motor as the driving source. The paper feeding mechanism drives a heat sensitive sheet or a normal sheet and ink sheet (or ink ribbon in the case of a heat transfer type), through a platen, in a stepping motion. The platen then contacts with a linear scanning thermal head having heating elements are selectively energized in accordance with print data such as letters, bar codes or the like, which will then print each line.

In this type of thermal printer, it may sometimes be required to temporarily stop the paper feeding motion before the completion of printing and then restart the printing operation.

Figure 9:
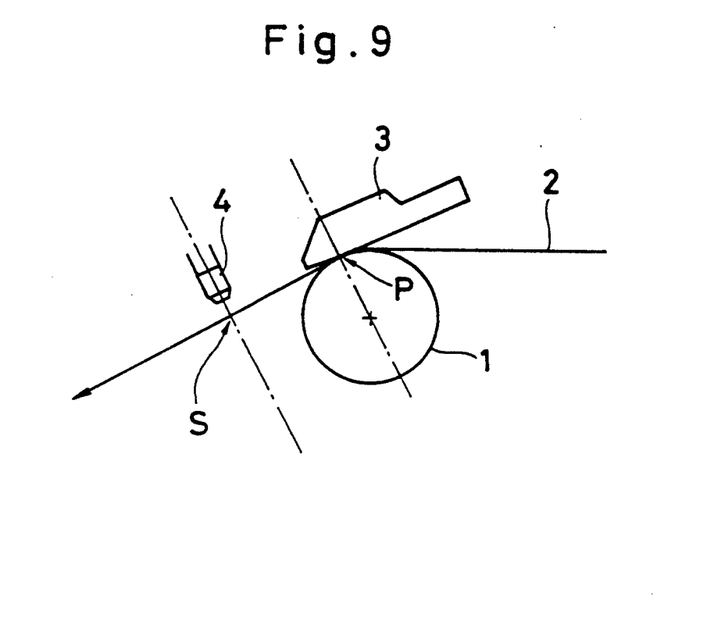
FIG. 9 is a schematic illustration showing essential members of a bar code printer which is one of the thermal printers according to the present invention.
Figure 10:
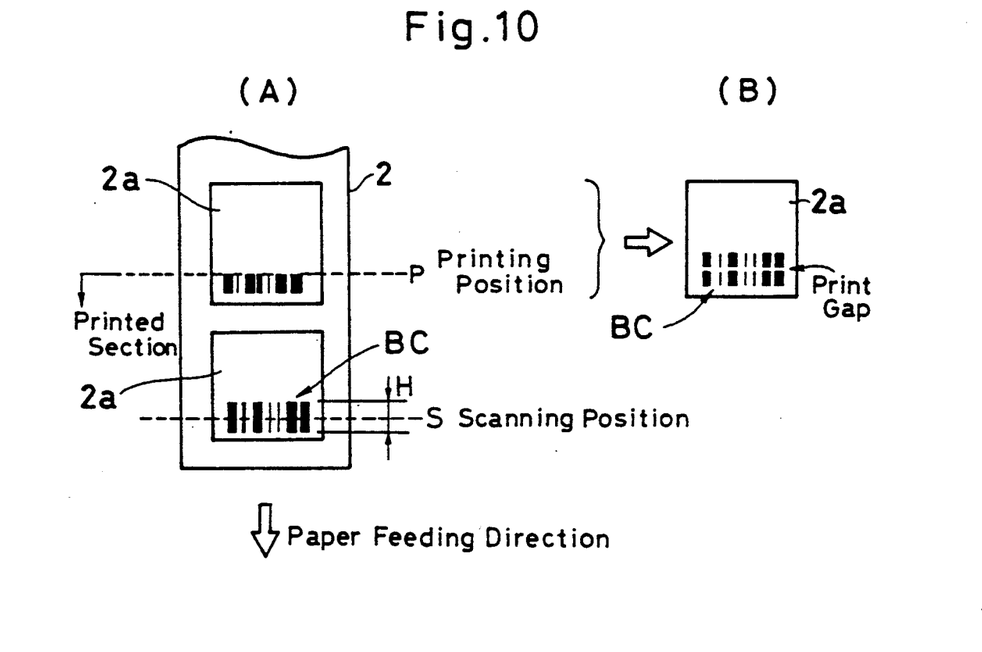
FIG. 10 is a schematic illustration showing an example of a conventional printed pattern by the bar code printer shown in FIG. 9, where the printing operation has been restarted after the printing operation including a paper feeding operation is temporarily stopped.

For example, a bar code printer, a kind of thermal printer, as shown in U.S. Pat. No. 4,795,281, is designed in such manner as that shown in FIG. 9 and FIG. 10(A) of the present specification, the thermal head 3 prints a bar code BC on a paper sheet 2 or a paper label 2a fed by the platen 1 and then, the printed bar code BC is read out by the scanner 4 which scans in a right angle direction with respect to the paper feeding direction, so as to verify the printed data with the input data. In this bar code printer, when the height H (as shown in FIG. 10) of the bar is too low to be scanned by the scanner 4 by the feeding of the paper sheet, the bar code printing operation is temporarily stopped to scan the preceding bar code because the printing position P and the scanning position S are isolated and then, the succeeding bar code printing operation is restarted.

Alternatively, when the verified data determines that the printed bar code is not completely formed (NG) even though the height H of the bar code is high enough to be scanned by the scanner 4 with the feeding of the paper sheet, the printing operation is immediately stopped. The scanner 4 scans the bar code again under the condition that the printing operation is stopped. When the verified data determines that the printed bar code is completely formed (OK), the printing operation is restarted to recontinue the printing of the bar code.

Figure 11:
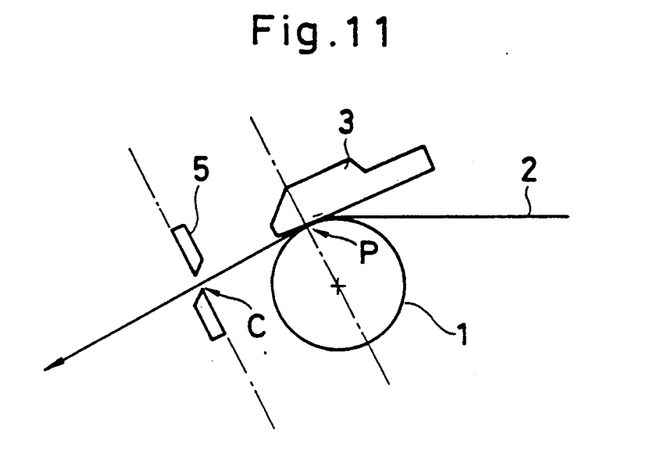
FIG. 11 and FIG. 12 are schematic illustrations showing essential members of other thermal printers according to the present invention.

Furthermore, the thermal printer, as shown in FIG. 11, is designed in such manner that a paper sheet 2 passed through a printing position P is cut by a stationary cutter 5. In this printer, it is preferable that the paper feeding operation is temporarily stopped for the cutting operation. However, the printing operation is simultaneously carried out with the cutting operation because the printing position P is relatively isolated from the cutting position C. Thus, the printing operation is temporarily stopped as the paper feeding operation stops.

In these kind of printers whereby paper feeding operation should be stopped when any operation such as, the cutting operation, is carried out in the downstream side of the printing position, in accordance with the printing size or printing interval of the paper feeding direction, the printing operation may coincide with the time when the paper feeding operation is stopped.

Furthermore, in the upperstream side of the printing position P, it may sometimes be required to temporarily stop the paper feeding operation for the printing operation.

Figure 12:
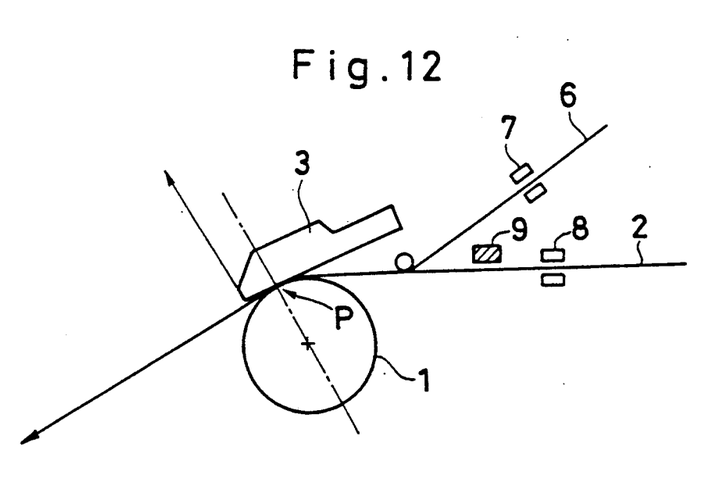

For example, as shown in FIG. 12, the heat transfer type thermal printer using an ink ribbon 6 includes a ribbon sensor 7 and a paper sensor 8 which respectively detect when the ribbon and paper run out. In this type of printer, the printing operation should be quickly stopped when the distance between the printing position P and the sensor 7 and 8 is short, the printing speed is fast, and the ribbon sensor 7 and/or the paper sensor 8 signal the end of either. If the printing operation is not stopped at once the same position at the ribbon will be repeatedly heated or the platen 1 is subjected to printing This condition may result in many problems.

In order to avoid such problems, the printing operation is repeated again from the beginning of the same page after changing the ribbon or the paper. However, this method tends to consume excess ribbon and paper, in order to prevent this from happening, the following control may be used.

Step numbers for feeding the paper from the printing position P to the ribbon sensor 7 or the paper sensor 8 are previously stored in a memory. When the ribbon sensor 7 and/or the paper sensor 8 output their signals, a control unit judges whether the printing operation can be performed to the end of the page or not, in accordance with the data stored in the memory and format length of the paper set in the printer. If possible, the printing operation will be restarted from the stopped position of the same paper.

Furthermore, as, shown in FIG. 12, a stamp 9 is arranged at the upstream side of printing position P to provide a mark prior to the printing. This stamping operation also needs to temporarily stop the paper feeding operation. This may interrupt the printing operation in accordance with the printing interval and printing size in the paper feeding direction.

In this kind of linear printing thermal printer, when the printing operation is restarted after temporarily,.. stopping the paper feeding operation, the printing cannot be started exactly from the interrupted section of the previous print due to the relationship between the paper motion and the print-timing, and/or the radiation of heat from the thermal head. This may generate a linear print-gap in the lateral direction of the bar code, as shown in FIG. 10(B), after the interruption of the printing operation of the bar code, as shown in FIG. 10(A). Thus, the bar code with the linear print-gap may cause some problems.

SUMMARY OF THE INVENTION

With these deficiencies in mind, it is an objective of the present invention to provide an improved thermal printer which can always provide clear and sharp prints in the form of letters, bar codes, or the like without the generation of a print-gap even when the printing operation is restarted after an interruption thereof.

In order to accomplish this objective, a thermal printer which makes use of a step motor for feeding sheet of paper and a linear scanning type thermal head, according to the present invention, comprises a delay drive which drives the thermal head with a delay for one or two clock periods, predetermined as a control parameter for printing, from a phase switch timing point in response to the time-lag defined from the phase switch timing point of the step motor, to an actual paper feeding motion; and a pre-print means which outputs a command signal to the thermal head to continue printing the print data following the final print data of when the paper feeding operation was stopped, prior to the regular drive timing of the thermal head when the printing operation is restarted.

The printing method which makes use of the above described thermal printer includes a first step for driving the thermal head with a delay of one or two clock periods, predetermined as a control parameter for printing, from a phase switch timing point in response to the delay period defined by the phase switch timing point of the step motor to an actual paper feeding motion; and a second step for making the thermal head restart the printing operation for continuing to print the print data following the final print data when the paper feeding operation is stopped, prior to the regular drive timing of the thermal head when the printing operation is restarted.

Other objectives of this invention will become apparent in understanding of the illustrative embodiments about to be described, or will be indicated in the appended claims. Various advantages not referred to herein will become apparent to one skilled in the art upon employment of the invention.

DETAILED DESCRIPTION OF PREFERRED EMBODIMENT

One preferred embodiment of the present invention will be described in detail, referring to the accompanying drawings.

Figure 1:
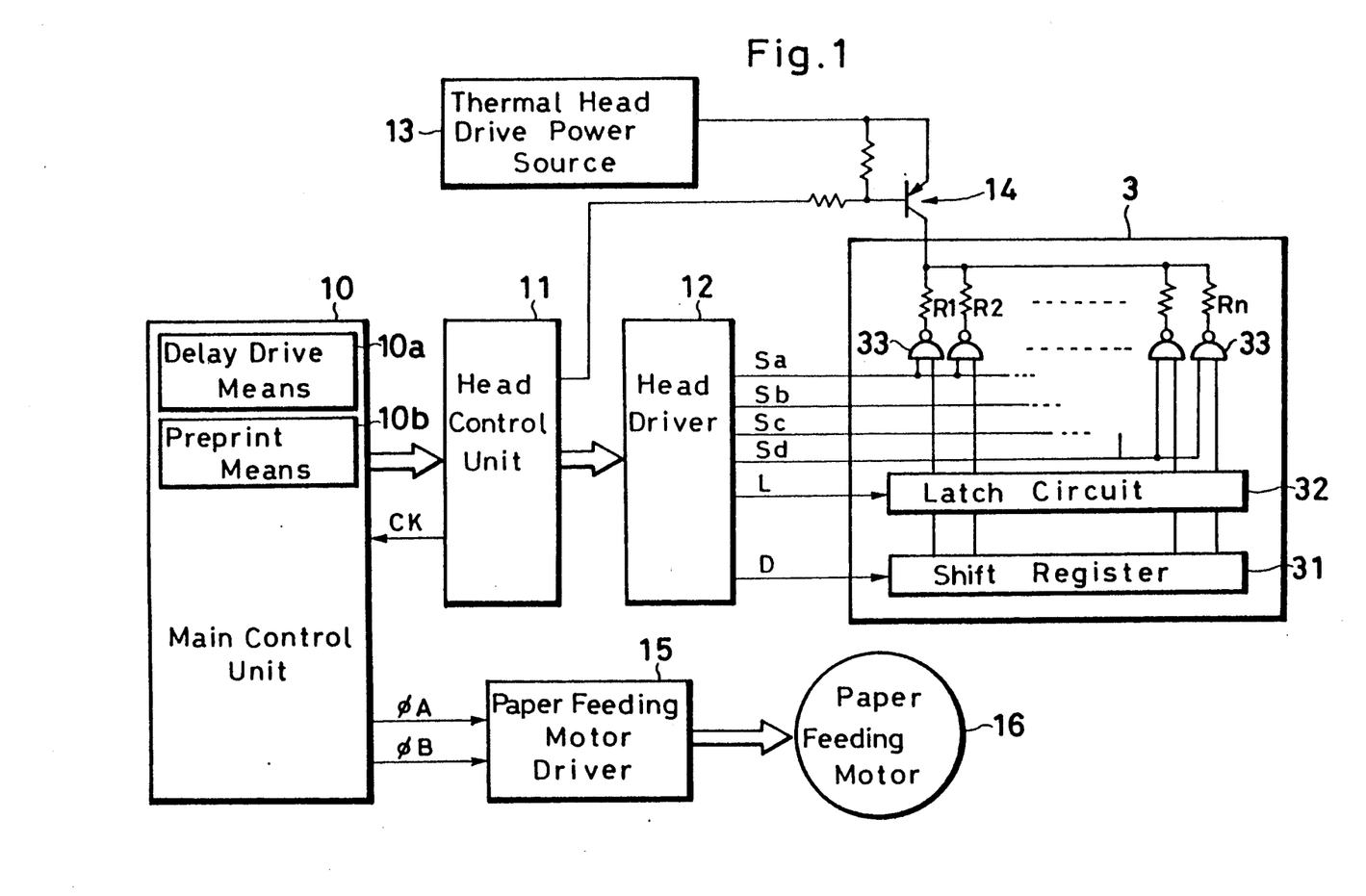
FIG. 1 is a block diagram showing a drive control system for a thermal head, and a paper feeding motor for a thermal printer according to the present invention.

FIG. 1 is a block diagram showing a drive control system for a thermal head and a paper feeding motor (step motor) of a thermal printer which is one preferred embodiment of the present invention. This thermal printer includes a linear scanning thermal head 3 having heat generating resistors R1 to Rn which are selectively supplied with electric energy from a thermal head drive power source 13, by a combination of a head driver 12 controlled by a head control unit 11 in response to the print data from a main control unit 10 and a switching transistor 14. Thus, each dot line can be selectively heated to form a print pattern in response to the print data. The switching transistor 14 is controlled by the signal from the head control unit 11 so that it is turned on only when the printing operation is carried out on each dot-line.

The thermal head 3 further includes a shift register 31 to which the print data D is transmitted from the head driver 12, a latch circuit 32 which latches the data for each bit whenever a latch signal L is input, and "n" pieces of NAND circuit 33 corresponding to each heat generating resistors R1 to Rn.

Figure 2:
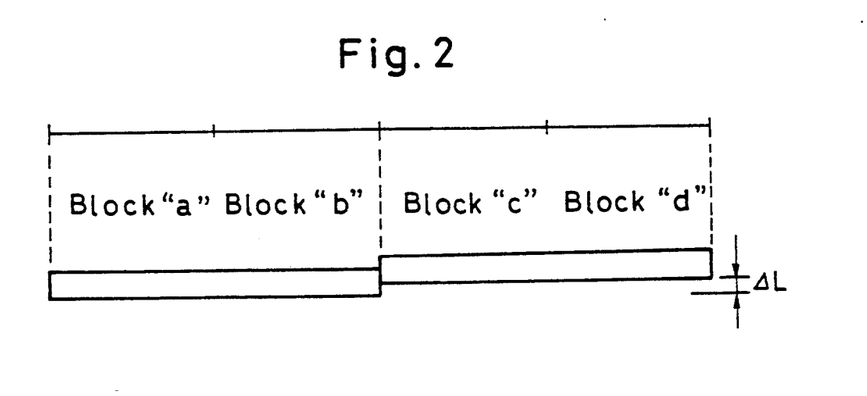
FIG. 2 is a schematic illustration showing one print line provided by the thermal printer shown in FIG. 1.

In this embodiment, one dot-line is divided into four blocks "a", "b", "c" and "d", as shown in FIG. 2. Four thermal head drive signals Sa, Sb, Sc and Sd are outputted from the head driver 12 so that n/4 pieces of NAND circuits 33 corresponding to the four blocks "a" to "d" are actuated for a predetermined period on each dot-line, respectively. Therefore, the "n" pieces of heat generating resistors R1 to Rn on each block are selectively energized in response to the print data latched in the latch circuit 32.

Figure 3:
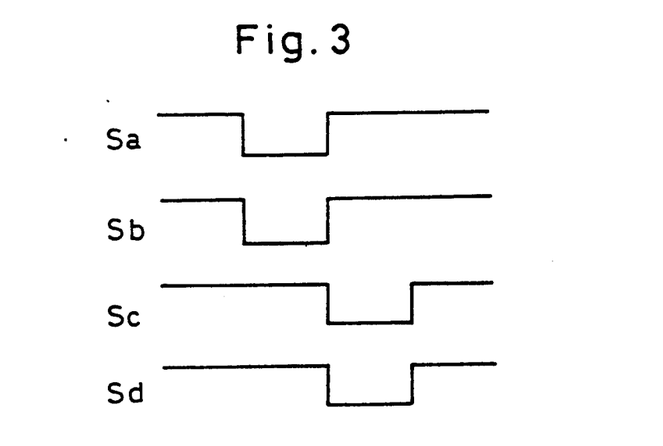
FIG. 3 is a diagram showing four output timing wave shapes of the thermal head drive signals Sa, Sb, Sc and Sd.

The, thermal head drive signals Sa, Sb, Sc and Sd are outputted at two different output timings as shown in FIG. 3; i.e., the signals Sa and Sb are outputted at the same timing but are different from the signals Sc and Sd. Thus, in the printing operation on one dot-line, a difference ΔL between the first block section "a" and "b" and the second block section "c" and "d" is generated in the paper feeding direction.

The main control unit 10 and the head control unit 11 are mainly composed of microcomputer units including CPU, ROM, RAM and so on, respectively. The main control unit 10 further includes a delay drive means, 10a and a pre-printing means 10b which are important structural arrangement of this invention which are described later.

Alternatively, the head control unit 11 may include these means 10a and 10b.

A paper feeding motor 16 is step driven by a paper feeding motor driver 15 which is actuated by two phase signals $\phi A$ and $\phi B$ outputted from the main control unit 10. These phase signals $\phi A$ and $\phi B$ are generated in response to a basic clock counter CK.

In this kind of thermal printer, the printing operation of the thermal head 3 always requires a time allowance between the print data transmitting operation and the printing operation in response to the print data because the print data is transmitted from the head control unit 11 to the shift register 31 in the thermal head 3 via the head driver 12 and the print data is further latched by the latch circuit 32 prior to the actual printing motion.

Figure 4:
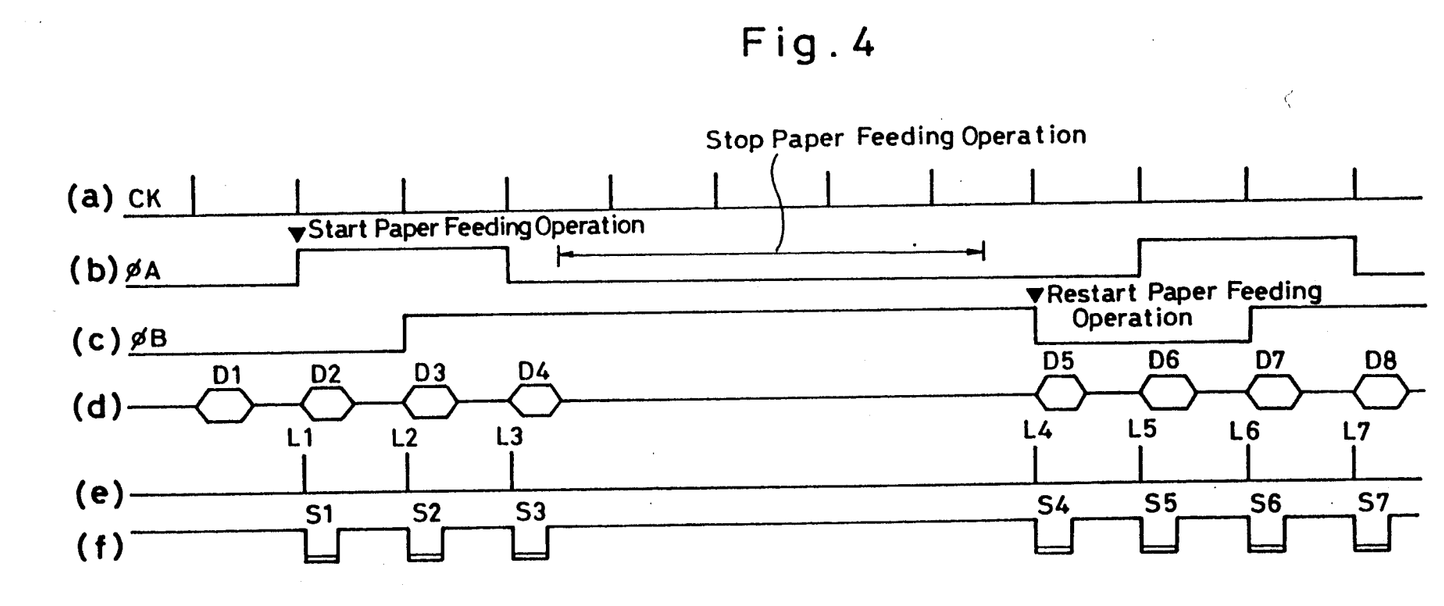
FIG. 4 and FIG. 5 are timing charts showing two different examples of basic operation for restarting the printing operation of the thermal printer after the paper feeding operation is temporarily stopped.
Figure 5:
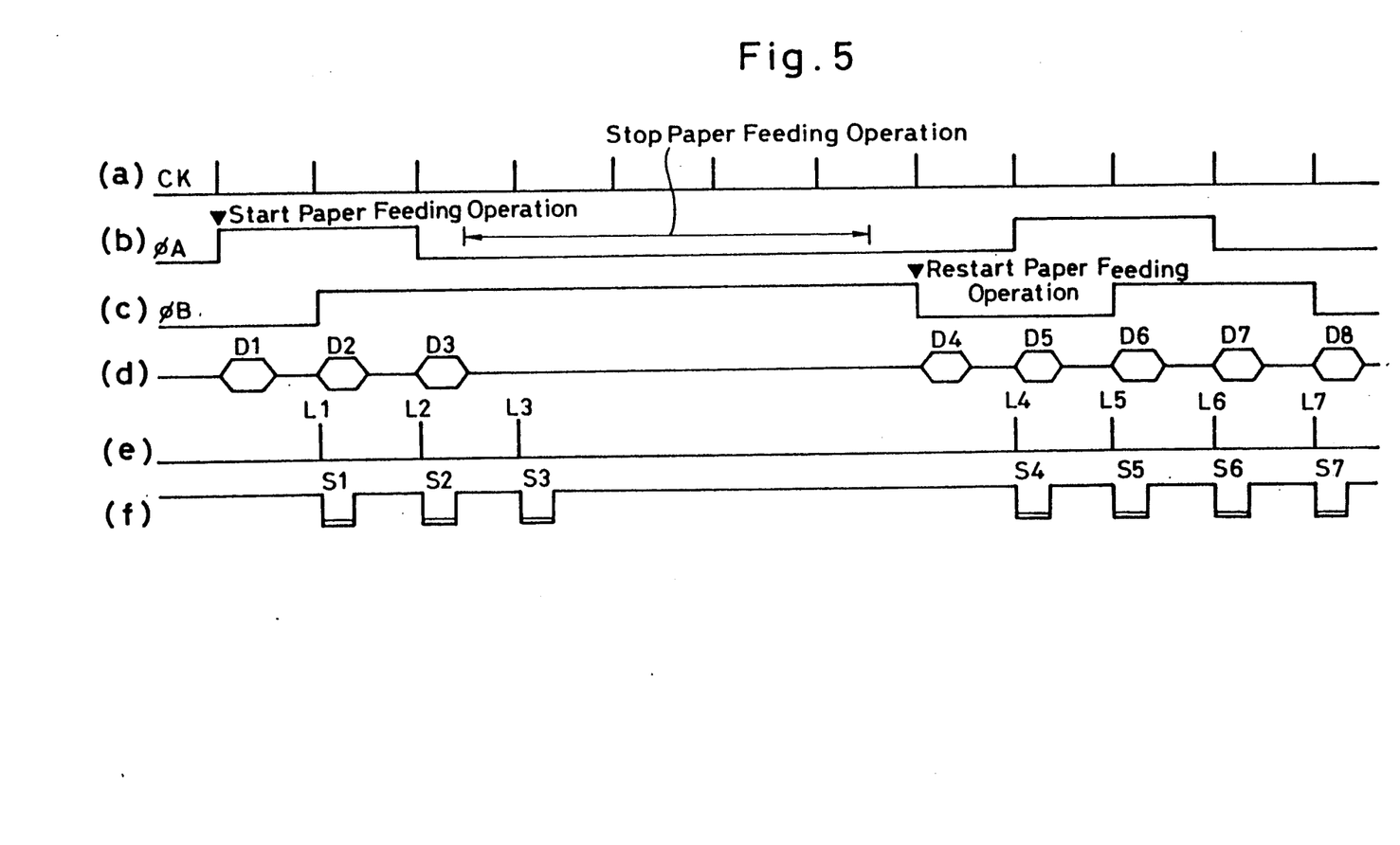

Therefore, two cases as shown in FIG. 4 and FIG. 5 are possible in the time relation between the phase switching operation of the paper feeding motor 16 and the printing operation to restart the paper feeding operation after the interruption of the printing operation.

In these drawings, reference letter (a) represents the basic clock counter CK for the printing operation. The paper feeding motor 16 is driven in synchronism with the time counting. Reference letter (b) and (c) represent the phase signals $\phi A$ and $\phi B$ for the paper feeding motor. Reference letter (d) represents the print data signal such as D1, D2, D3, —to be transmitted to the shift register 31 in the thermal head 3. Reference letter (e) represents the latch signal such as L1, L2, —for the print data. Reference letter (f) represents the drive signal S for the thermal head, such as S1, S2, —each of which includes four signals Sa, Sb, Sc and Sd, as shown in FIG. 2.

In the first case shown in FIG. 4, the printing operation on the first dot line is started at the same time as the phase switch timing point for the paper feeding operation. Therefore, the print data is transmitted to the shift register 31 in the thermal head 3 prior to the start of the paper feeding operation.

In the second case shown in FIG. 5, the printing operation on the first dot line is started after one clock period from the time of the phase switching for the paper feeding operation. Therefore, the print data is transmitted to the shift register 31 in the thermal head 3 at the same time as the start of the paper feeding operation.

Actually, the paper feeding operation by the step motor 16 is always delayed from the phase switch timing point of the step motor 16 due to delays in rise time of the current supplied to the motor and the mechanical motion of the paper feeding mechanism.

One of the features of the present invention is to compensate for the delay of the actual paper feeding motion from the phase switch timing point by controlling the drive timing of the thermal head. In detail, the thermal head 3 is driven with a delay of one or two clock periods provided by the basic clock counter CK from the phase switch timing point by the delay drive means 10a in the main control unit 10.

Figure 6:
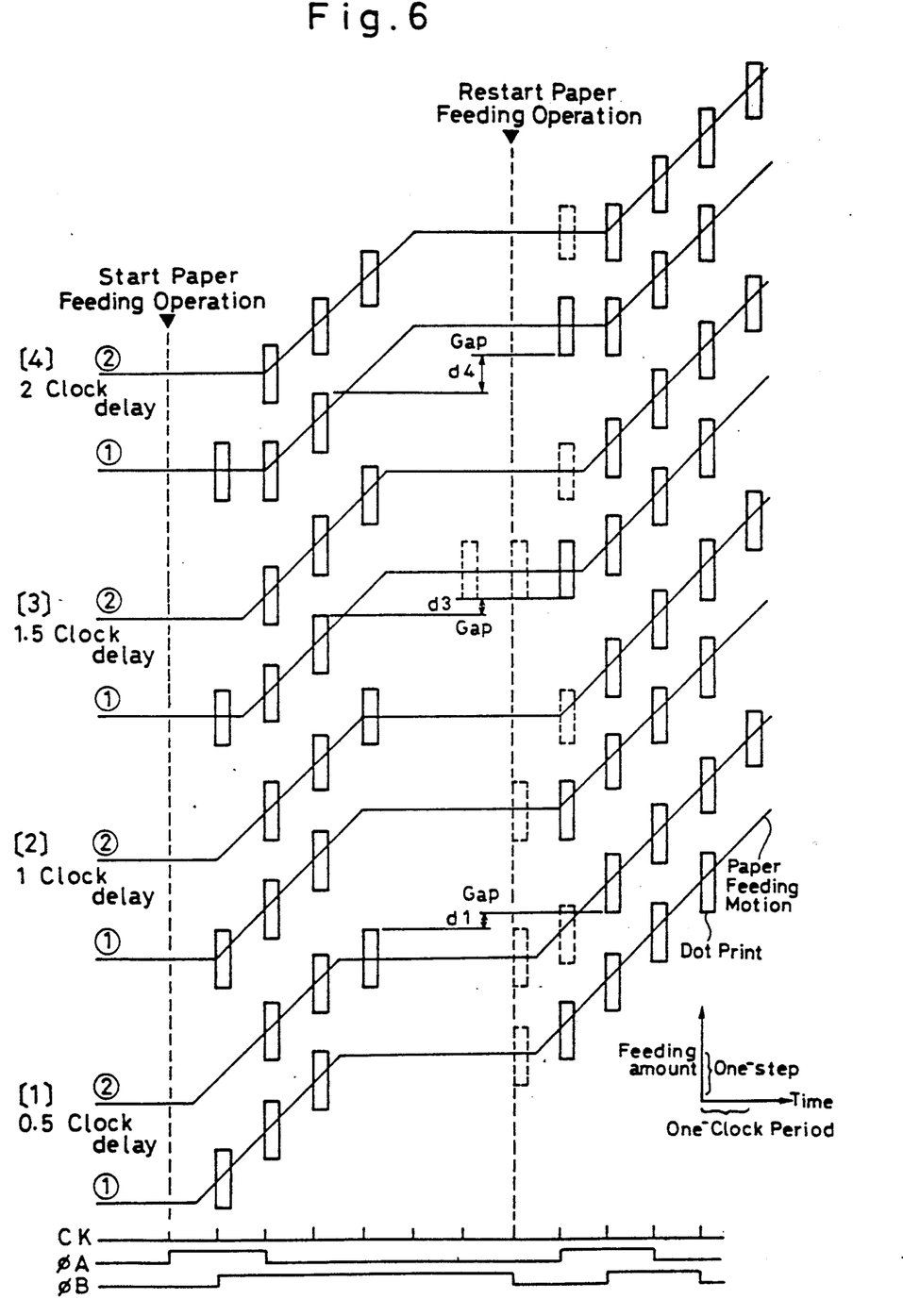
FIG. 6 is a schematic illustration for basically explaining the printing method according to the present invention.

This control process is described in FIG. 6 in detail. This diagram shows four cases whereby the respective paper feeding motions are delayed for 0.5 clock period; i.e. case, [1], 1 clock period; case [2], 1.5 clock periods; case [3], 2 clock periods; case [4] from the phase switch timing point. In each of the four cases [1] to [4], the paper feeding motion is represented by a rigid line and the dot-printing operation is represented by a small rectangle, and two operation modes ①  and ② are shown.

Mode ①: the thermal head is driven with a delay of one clock period from the phase switch timing point.

Mode ②: the thermal head is driven with a delay of two clock periods from the phase switch timing point.

In this embodiment, the delay is limited to two clock periods, as the step motor will not be able to stop the paper feeding operation when the paper feeding motion is delayed for a period longer than two clocks.

According to FIG. 6, the cases[1]-②, [3]-①, and [4]-① provide physical gaps d1, d3, and d4 in the print timing, but the other cases[1]-①, [2]-①, [2]-②, [3]-②, and[4]-② do not provide such a gap. As can be seen, it is preferable to drive the thermal head according to these operation modes.

Assuming that the paper feeding motion is delayed for "n" clock period from the phase switch timing point, the thermal head is preferably driven according to the operation mode ① when $n \leq 1$ and the operation mode ② when $1 \leq n \leq 2$. When n=1, the operation modes ① and ② are available.)

It is easily anticipated that the operation based on the case shown in FIG. 4 cannot absorb actual delay in the paper feeding motion and thus, physical gaps become remarkable.

Since this thermal printer cannot automatically realize the delay between the phase switch timing point of the paper feeding motor, and the actual paper feeding motion, experimentation in practice, provides such a delay.

In this printer, the delay depends on the printing speed; i.e., the delay is as short as the printing speed is slow and the delay is as long as the printing speed is fast. Accordingly, the operation modes ① and ② may be switched in response to the printing speed, for example, the printing speed must be decreased to provide a high quality print.

Alternatively, in addition to experimenting to obtain the delay, the following control modes (1) to (4) are stored in ROM and these data are selectively switched by a DIP switch. For example, a user may select the optimum control mode for the actual delay by judging from quality of printed material. Thus, selected control modes are allocated in the DIP switch to fit the delay.

(1) The thermal head is regularly driven with the delay of one clock period and the printing operation is actuated once prior to the regular drive timing of the thermal head when the printing operation is restarted.

(2) The thermal head is regularly driven with the delay of one clock period and the printing operation is actuated twice prior to the regular drive timing of the thermal head when the printing operation is restarted.

(3) The thermal head is regularly driven with the delay of two clock periods and the printing operation is actuated once prior to the regular drive timing of the thermal head when the printing operation is restarted.

(4) The thermal head is regularly driven with the delay of two clock periods and the printing operation is actuated twice prior to the regular drive timing of the thermal head when the printing operation is restarted.

Next, another feature of the present invention will be described. The present invention provides a control means to resolve the problem of vague and unclear prints that are generated at the restart of the printing operation, and caused by gaps, described above, and/or heat radiation from the thermal head in its idle state.

As shown in FIG. 1, the main control unit 10 includes the preprint means 10b which acts at the restart of the printing operation to print one or more times the print data followed by the final print data when the paper feeding operation has stopped, prior to the above described regular drive timing of the thermal head. The phantom line rectangles shown in FIG. 6 represent the prints provided by this control.

The control cases [1]-①,[2]-①,[2]-②, [3]-②,[4]-② require one pre-print because the physical gap does not between the third printed dot and the fourth printed dot. Thus, the pre-print using the same print data as the fourth print is carried out at one clock period before the fourth print timing so as to prevent the fourth print from printing unclearly. This pre-print ensures the preheating for the heat generating resistors in the thermal head 3.

Although the first print also tends to be unclear or vague, the unclearness of this print can be ignored. Particularly in the bar-code printing operation, the interruption caused by the unclearness in the identical bar-code often causes serious problems such that the bar-code information cannot be read or may be misread.

In FIG. 6, the control cases [1]-② and [3]-① require a second pre-print because the physical gap has occured between the third printed dot and the fourth printed dot.

Since the control case [1]-② drives the thermal head 3 with the delay of two clock periods from the phase switch timing at the restart of the paper feeding operation, one pre-print is carried out at one clock period before the restart so as to eliminate the gap d1. An addition pre-print is carried out one more clock period before the above pre-print timing in order to avoid the generation of the unclear print at the restart. As a result, the pre-print is started at the same time as the restart timing of the paper feeding operation.

In the control case [3]-①, the second pre-print at two clock periods before the fourth print in the same manner as the control case [1]-② cannot eliminate the gap d3. Therefore, the printing operation with the print data for the fourth print is repeated three times so as to enrich the print dot at the fourth step. The enriched print dot does not make the gap prominent. Thin manner is available for a gap smaller than ⅓ of one step of the print dot.

However, this manner is not available for the control case [4]-① because the gap d4 is too great. Thus, the case [4]-② may substitute for it.

In such a manner, the present invention can resolve the problem described above by the combination of the drive timing of the thermal head and the pre-print times before the restart of the printing operation in response to the delay period between the actual paper feeding motion and the phase switch timing of the paper feeding step motor.

Figure 7:
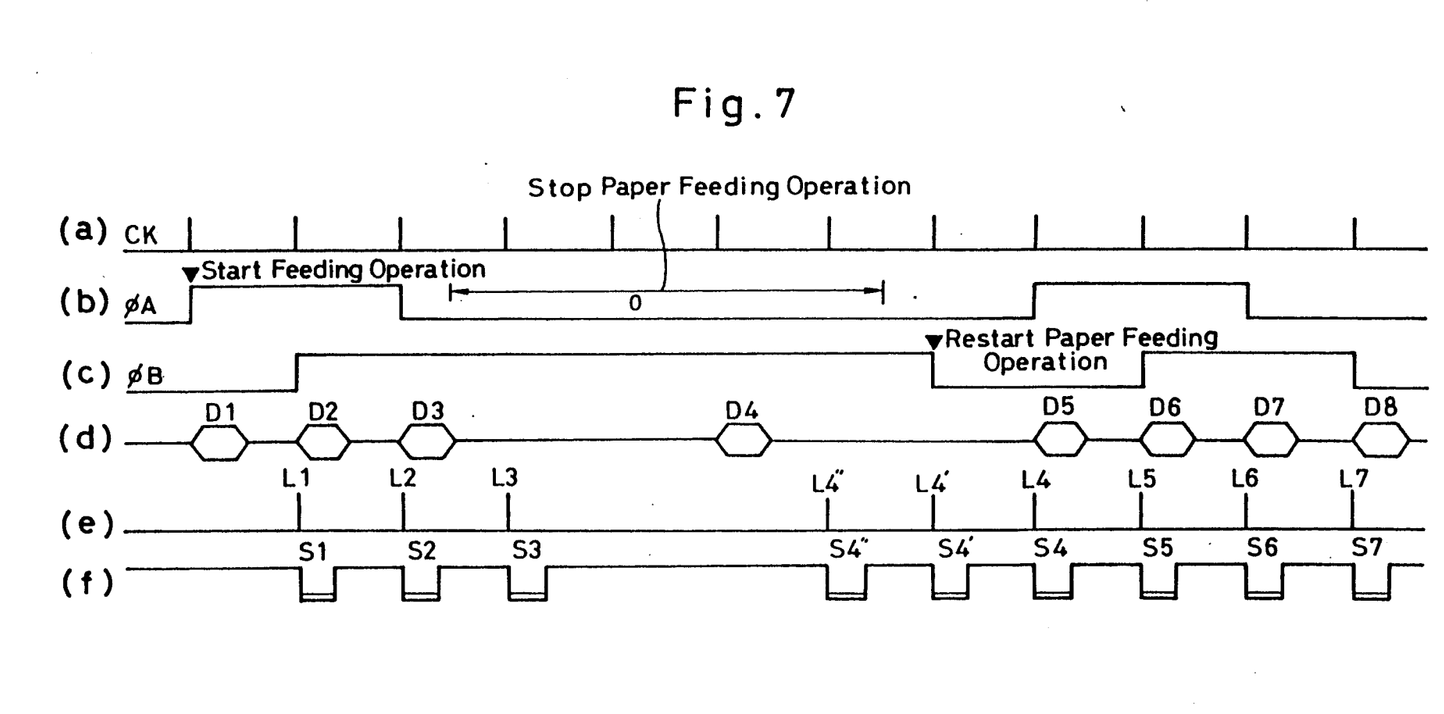
FIG. 7 and FIG. 8 are timing charts, as with FIG. 4 and FIG. 5, showing different operations of the other embodiments.

FIG. 7 shows one example of a timing chart using the control case [3]-① in FIG. 6, wherein reference letters (a) to (f) represent the same as FIG. 4 and FIG. 5. For the sake of clarity, the same explanation is repeated as follow: reference letter (a) represent the basic clock counter CK for printing operation; reference letters (b) and (c) represent the phase signals for $\phi A$ and $\phi B$ for the paper feeding motor; reference letter (d) represents the print data signal D; reference letter (e) represents the latch signal L for the print data; and reference letter (f) represents the drive signal S for the thermal head.

According to this control, a print data signal D1 is transmitted to the shift register 31 in the thermal head 3 shown in FIG. 1 at the phase switch timing point for the paper feeding operation. At the next clock time, the data D1 is latched in the latch circuit 32 in response to the print data latch signal L1 and the content of the data D1 is printed in response to the thermal head drive signal S1. At the same time, the succeeding print data signal D2 is transmitted to the shift register 31 in the thermal head 3 and latched in the latch circuit 32 in response to the print data latch signal L2 and the content of the data D2 is printed in response to the thermal head drive signal S2 in the same manner as above-described.

In this control, the printing operation is carried out with the delay of one clock period from the paper feeding motion. Therefore, when the paper feeding operation is stopped, the printing operation is stopped at the next clock time after the final phase switching operation; corresponding to S3.

When the printing operation is restarted after the paper feeding operation is stopped during the period A because of a check operation or a paper cutting operation, the print data signal D4 is transmitted to the shift register 31 at three clock periods before the regular drive timing represented by the signal S4. Then, the data signal D4 is latched in the latch circuit 32 at two preceding clock periods in response to the latch signal L4″, and the content of the data signal D4 is printed in response to the thermal head drive signal S4‴. Further, the same content of the data signal D4 is latched in the latch circuit 32 again in response to the latch signal L4′ at one preceding clock period. The same content is printed in response to the thermal head drive signal S4′.

At the following clock period, the content of the print data D4 is latched in the latch circuit 32 in response to the latch signal L4, and is printed in response to the thermal head drive signal S4 which is regularly generated. At the same time, the following print data signal D5 is transmitted to the shift register 31 and then, the printing operation is carried out in the same manner as above-described.

Figure 8:
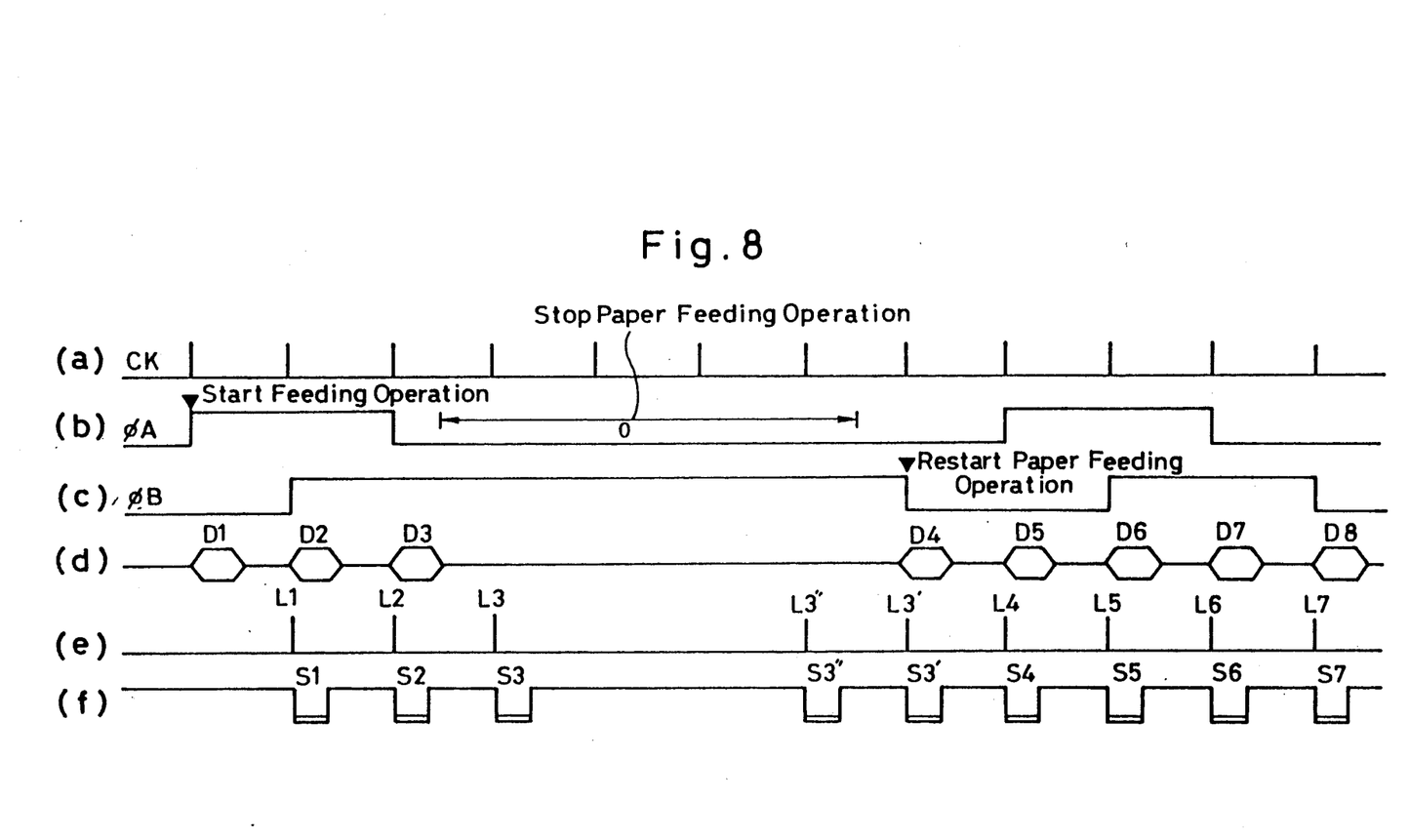

FIG. 8 shows another example of timing chart for printing bar code using the control case [3]-① in FIG. 6, wherein reference letters (a) to (f) represent the same as FIG. 7 so that the same explanation need not be repeated here.

Upon printing for the bar code, the content of the print data D3 before the paper feeding operation is stopped and is identical with the print data D4 at the restart. Therefore, the control shown in FIG. 7 is not required. As shown in FIG. 8, the printing operation is carried out twice in response to the print data latch signals L3″ and L3′ and thermal head drive signal S3″ and S′. Then, the print data D4 is first transmitted to the shift register 3 at the restart of paper feeding operation in the same manner as the ordinary print timing so that the print data D4 is printed in response to the latch signal L4 and the thermal head drive signal S4 at the following clock time.

As described above, in the bar code printing operation, the content of the print data following the final print data just before the paper feeding operation is stopped is identical with that of the final print data.

In the case of a heat transfer type thermal printer, since the ink ribbon is driven in synchronism with the paper feeding operation through a mechanical transmission unit including gears and belts from the power source for the paper feeding system, the same position at the ink ribbon will be heated at least twice if the printing operation is repeated twice or more without actuating the paper feeding system. In order to avoid this phenomenon, the ink ribbon feeding system may belong to another power source isolated from the paper feeding system so as to feed the ink ribbon alone even when the paper feeding operation is stopped.

The control program wherein the first dot line is printed at least twice at the restart of printing operation may be carried out only when the non-actuated period of the paper feeding operation from its stop moment exceeds a predetermined value. For this alternative control, the thermal printer may include any additional means for counting the non-actuated period.

In the above described embodiment, the basic clock counter for printing operation is in synchronism with the phase switch timing of the paper feeding motor, and the drive timing of the thermal head is so adjusted so as to delay one or two clock periods with reference to the basic clock signal generated from this, counter. However, in order to exactly control for actual delay in the paper feeding motion, the drive timing of the thermal head must be finely adjusted, for example, two delay 1.5 clock periods. Therefore, the basic clock counter may include a frequency demultiplier to generate a high frequency clock signal. The delay of the drive timing of the thermal head may be measured by the high frequency clock signal in order to achieve such an exact control.

In the case where the printing speed is relatively low and the printing operation is always carried out at a stable point of the step of the paper feeding motor, the printing operation can be performed at either the timing shown in FIG. 4 or the timing shown in FIG. 5. This case does not generate any print gaps even when the paper feeding is temporarily stopped in the printing operation. Accordingly, the control program shown in FIG. 5 is not available for this case.

As mentioned above, the thermal printer according to the present invention provides the drive timing in response to the actual paper feeding motion when the printing operation is restarted after the interruption of the printing operation, and makes the thermal head print at least twice only the first dot line at the restart of the printing operation. This can eliminate the unclear or vague prints and gaps from the restart position, thereby, improving the print quality.

Further, the printer according to the present invention does not require additional energy consumption to perform this control so that the power source can be selected from commonly used units.

In the case wherein the printer is provided with a cutter, the cutter can be arranged in a stationary position. This does not require such a complicated manner that the cutter is shifted to fit the cutting size, and also reduces its shifting mechanism. Consequently, the above-described structural arrangement will realize a compact and simple cutter mechanism.

Although the invention has been described in its preferred form with a certain degree of particularity, it is understood that the present disclosure of the preferred form has been changed in the details of construction and the combination and arrangement of parts may be undertaken without departing from the spirit and the scope of the invention as hereinafter claimed.

What is claimed is:
1. A thermal printer, comprising:
a step motor for feeding a sheet of paper;
a linear scanning type thermal head and a control means by which a paper feeding operation is temporarily stopped, wherein a printing operation is restarted after a stopped period;
a delay drive means for driving the thermal head with a delay of one or two clock periods, predetermined as a control parameter for said printing operation, from a phase switch timing point of said step motor, in response to a time-lag defined by the phase switch timing point to an actual paper feeding motion; and
a pre-print means for outputting a command signal to begin said printing operation by said thermal head, for printing at least one time a print data which follows a final print data of when said paper feeding operation was stopped, prior to said drive means driving said thermal head at a restart of the printing operation.

2. A printing method by a thermal printer using a step motor for feeding a sheet of paper, a linear scanning type thermal head and a control means by which a paper feeding operation is temporarily stopped and a printing operation is restarted after a stopped period, comprising the steps of;
a first step for driving said thermal head with a delay of one or two clock periods, predetermined as a control parameter for said printing operation, from a phase switch timing point of said step motor in response to a time-lag defined by the phase switch timing point to an actual paper feeding motion; and
a second step for making said thermal head restart said printing operation for printing at least one time a print data which follows a final print data of when said paper feeding operation was stopped, prior to said step for driving said thermal head at a restart of the printing operation.

3. The printing method as set forth in claim 2, wherein said time-lag defined by the phase switch timing point to an actual paper feeding motion is "n" clock period, in said first step, said thermal head being regularly driven with a delay of a one clock period by the phase switch timing point when $n \leq 1$, or two clock periods from the phase switch timing point when $1 \leq n \leq 2$.

4. The printing method as set forth in claim 2, wherein said second step further comprises a time measuring step for measuring a stop period of said paper feeding operation and outputting a drive signal to said thermal head, wherein said thermal head prints at least once prior to a printing operation at a regular drive timing.

* * * * *